(12) United States Patent
Kashima

(10) Patent No.: US 7,042,648 B2
(45) Date of Patent: May 9, 2006

(54) OBJECTIVE LENS

(75) Inventor: Shingo Kashima, Sagamihara (JP)

(73) Assignee: Olympus Corporation, Tokyo (JP)

( * ) Notice: Subject to any disclaimer, the term of this patent is extended or adjusted under 35 U.S.C. 154(b) by 17 days.

(21) Appl. No.: 10/823,639

(22) Filed: Apr. 14, 2004

(65) Prior Publication Data

US 2004/0252380 A1 Dec. 16, 2004

(30) Foreign Application Priority Data

Apr. 15, 2003 (JP) .............................. 2003-110700

(51) Int. Cl.
 *G02B 21/02* (2006.01)

(52) U.S. Cl. ...................................... 359/661; 359/355
(58) Field of Classification Search ................ 359/641, 359/642, 643, 644, 645, 646, 647, 661, 355; 357/357

See application file for complete search history.

(56) References Cited

U.S. PATENT DOCUMENTS 5,469,299 A * 11/1995 Nagano ...................... 359/661

* cited by examiner

*Primary Examiner*—Hung Xuan Dang
(74) *Attorney, Agent, or Firm*—Kenyon & Kenyon LLP

(57) ABSTRACT

An objective lens includes a diffractive optical element constructed of a medium having an internal transmittance of at least 50% at a wavelength of 300 nm when the thickness is 10 mm and a cemented doublet made up of two lenses having media of different refractive indices and Abbe's numbers. The diffractive optical element is optimized to take advantage of a fluorescent wavelength. An NA of the objective lens where correction for aberration is made and an NA of the objective lens where the effective diameter is determined are different from each other to satisfy the following condition:

$$NAe > 1.5 \times NAc$$

where NAe is the NA of the objective lens where the effective diameter is determined and NAc is the NA of the objective lens where correction for aberration is made. The objective lens is constructed as a water-immersion objective lens in which the NA of the objective lens where the effective diameter is determined is at least 0.6.

13 Claims, 10 Drawing Sheets

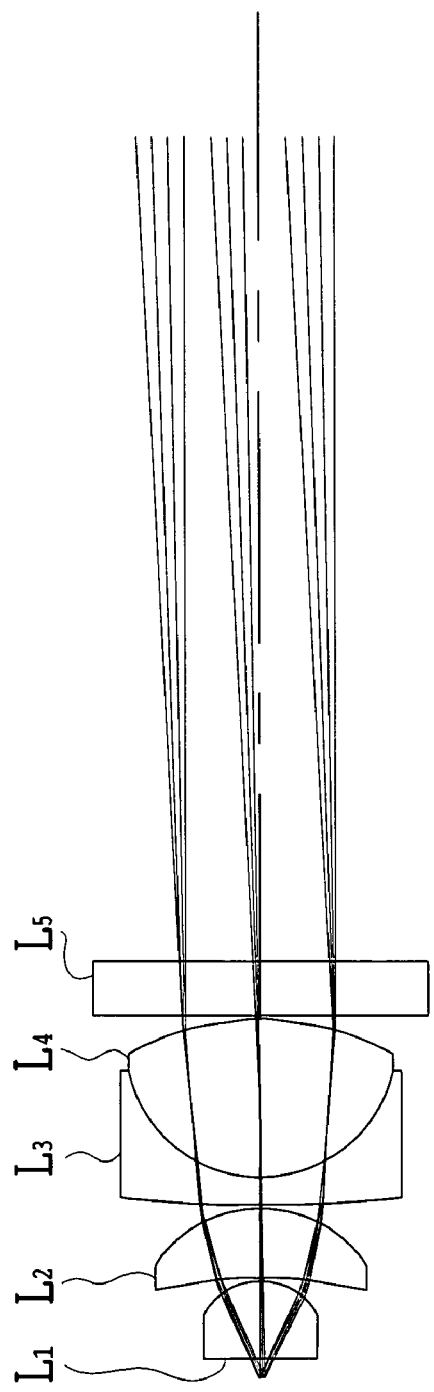
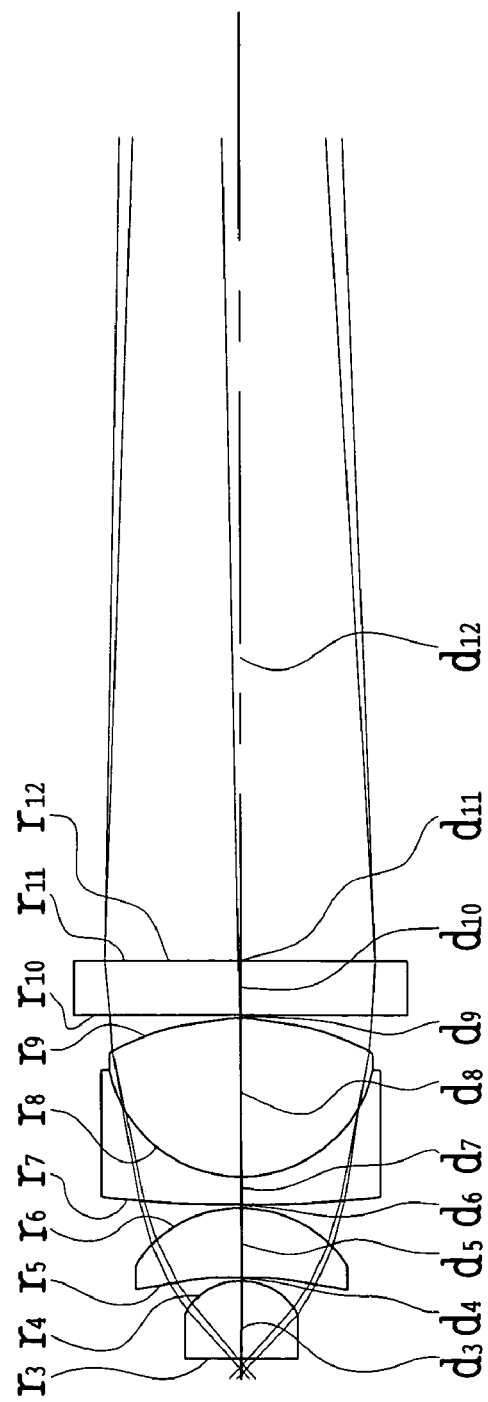
FIG.1A
FIG.1B

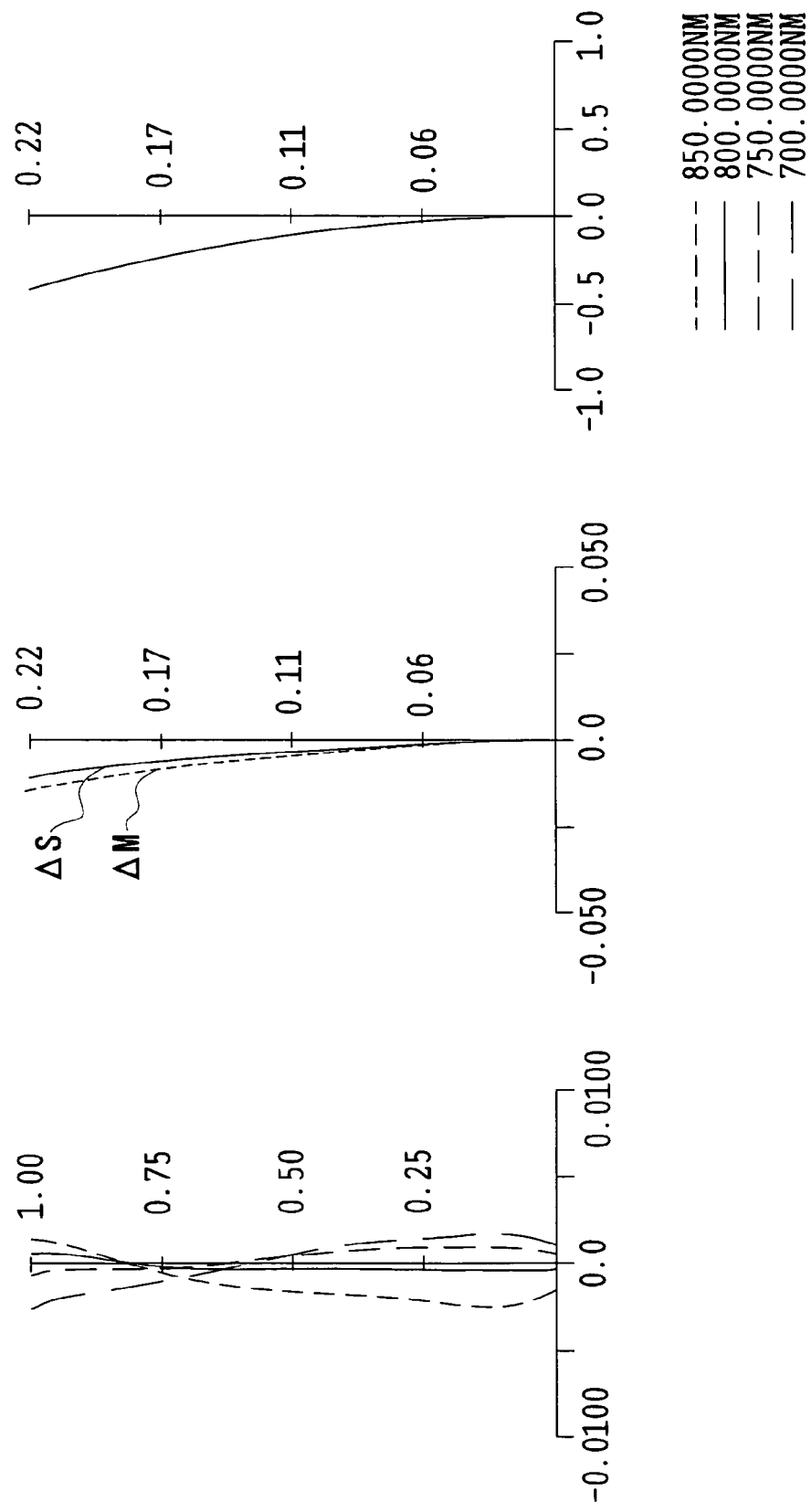

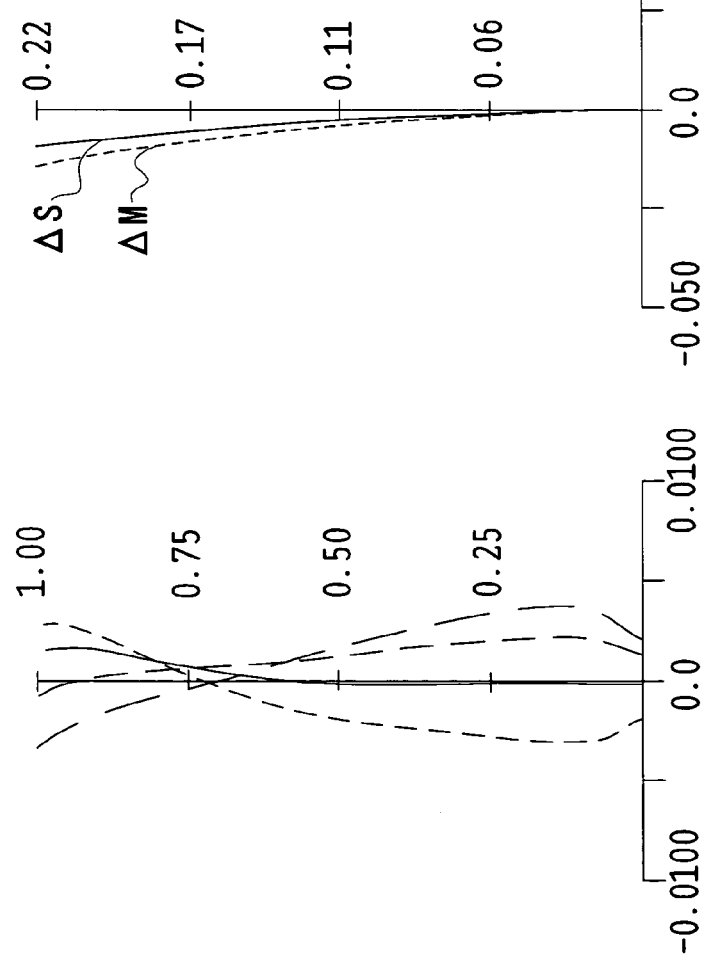
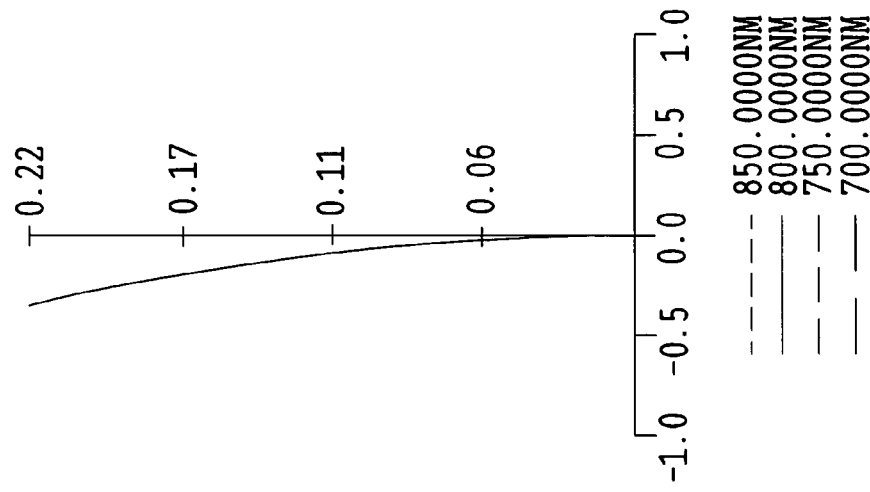

OBJECTIVE LENS

BACKGROUND OF THE INVENTION

1. Field of the Invention

This invention relates to an objective lens used in a multiphoton microscope.

2. Description of Related Art

In order to carry out a three-dimensional observation without breaking a deep part in a living tissue that has been difficult in the use of a conventional confocal laser scanning microscope, special attention has recently been devoted to a microscope using a multiphoton excitation technique (a multiphoton microscope).

The multiphoton excitation technique is the one that excitation generally caused by one photon (a single photon) is done by multiphoton. For example, in a two-photon excitation technique, fluorescence excitation done at a wavelength of 400 nm in a single-photon excitation technique is done at a wavelength of 800 nm twice as great. In this case, the energy of one photon at a wavelength of 800 nm is one-half of that of one photon at a wavelength of 400 nm, and therefore, in the case of a wavelength of 800 nm, two photons are used to cause fluorescence excitation.

In an ordinary single-photon excitation technique, when a substance absorbs light to produce fluorescence, fluorescent energy is less than absorption energy. Consequently, fluorescent light is shifted to the longer-wavelength side than excitation light. For example, serotonin is excited at a wavelength of 260 nm to thereby produce auto-fluorescence with wavelengths of 300–380 nm.

In contrast to this, the multiphoton excitation technique is to detect fluorescent light on the shorter-wavelength side than excitation light by using a wavelength at least twice that of the single-photon excitation technique. For example, in a three-photon excitation technique, serotonin is excited at a wavelength of 750 nm to thereby produce auto-fluorescence with wavelengths of 300–380 nm.

In such a multiphoton excitation technique, it becomes possible to observe fluorescent light with desired wavelengths in an ultraviolet-to-visible region by irradiation of near-infrared laser light.

In the multiphoton microscope, femtosecond ultrashort-pulse laser light with a repetition frequency of about 100 MHz is used as the excitation light in order to cause excitation with a wavelength at least twice greater than the case of one-photon absorption when fluorescent light with identical wavelengths is produced.

The multiphoton microscope is constructed so that, for example, near-infrared ultrashort-pulse laser light emitted from a laser device is collected on a specimen through an objective lens, and fluorescent light produced by multiphoton absorption is detected by a detector through the objective lens, a dichroic mirror, and a collector lens to form a three-dimensional image through a monitor.

According to a two-photon microscope, two-photon absorption is produced in the probability that is proportional to the square of the intensity of excitation light. Additionally, only in an extremely small area close to the focal point of the excitation light, two-photon excitation is caused in the probability that is proportional to the square of a photon density per unit hour and unit volume, and absorption, the production of fluorescence, and a photochemical reaction are localized in the focal spot of a convergent excitation beam, with the result that high spatial resolution is obtained.

According to the multiphoton microscope, fluorescence is produced in only an extremely small part of a specimen, and hence there is the advantage of being able to obtain an image that is very small in depth of focus, such as a so-called tomographic image, even in a thick specimen.

According to the multiphoton microscope, since when fluorescent light with identical wavelengths is produced, excitation is caused with a wavelength at least twice greater than the case of one-photon absorption, the scattering of the fluorescent light in the specimen is reduced by at least one figure and the S/N ratio of fluorescence measurement is improved.

In the multiphoton microscope, as mentioned above, transition energy in the visible region can be excited by the near-infrared pulse light, and excitation light can be transmitted to a considerable depth of a living specimen without undergoing absorption caused by electronic transition or molecular vibration, outside the focal point. Moreover, in the multiphoton microscope, a diffraction-limit microscopic observation image in the ultraviolet region can be obtained by pulse light in the visible region.

In order to generate multiphoton fluorescence, as described above, an extremely high intensity of light is required. However, when multiphoton excitation is caused by a pulse laser of the order of usually used nanoseconds or 100 picoseconds, for example, a living specimen, such as cells, suffers damage because absorption energy is too high. In contrast to this, when the multiphoton excitation is caused by a pulse laser of the order of femtoseconds, a photon density sufficient for the two-photon absorption is provided and the absorption energy can be reduced.

The two-photon excitation, as mentioned above, is caused in the probability that is roughly proportional to the square (the third power in three-photon excitation). of a photon density per unit hour or unit volume. However, when the multiphoton excitation is caused by the pulse laser of the order of femtoseconds, the probability that a plurality of photons exist becomes high because a pulse width is very narrow.

Thus, in the multiphoton microscope, a laser that has an ultrashort pulse of the order of 100 femtoseconds, a near-infrared wavelength, and a repetition frequency of about 100 MHz is used as the most suitable one.

However, laser light emitted from a pulse laser source has some wavelength band, and the pulse width of the laser light is spread each time it passes through an optical element. If many optical elements are arranged and the laser light, after passing through the elements, reaches the specimen, the problem will arise that the pulse width is considerably spread at the position of the specimen and the multiphoton excitation ceases to occur.

As an approach for solving the problem of the spread of the pulse width, a technique (prechirp compensation) that prisms are used to "transmit light with short wavelength ahead of light with long wavelength", namely to "transmit light with long wavelength behind light with short wavelength", is generally known. This technique is detailed in "Femtosecond pulse width in microscopy by two-photon absorption autocorrelation"/G. J. Brakenhoff, M. Muller, and J. Squier/J. of Microscopy, Vol. 179, Pt. 3, September 1995, pp. 253–260.

In this technique, a plurality of prisms are arranged along the optical path of a laser beam, which is passed through the prisms to thereby widen the wavelength band, and spacing between the prisms or the relative positions of the prisms themselves to the optical axis are changed so that the optical path length on the long-wavelength side is different from that on the short-wavelength side. Consequently, light with short wavelength is transmitted ahead of light with long wavelength and light with long wavelength is transmitted behind light with short wavelength.

On the other hand, for example, Japanese Patent Kokai No. Hei 06-331898 discloses a conventional objective lens used in a microscope for observation due to single-photon excitation, employing a diffractive optical element as an objective lens which has a high magnification and a high NA and is corrected for aberrations, notably chromatic aberration, without randomly using cemented lens components and anomalous dispersion glass.

Further, for example, Japanese Patent Kokai No. Hei 06-281864 discloses a conventional objective lens used in a microscope for observation due to two-photon excitation.

SUMMARY OF THE INVENTION

The objective lens according to the present invention includes an optical element constructed of a medium that has an internal transmittance of at least 50% at a wavelength of 300 nm when the thickness is 10 mm.

The objective lens according to the present invention includes at least one diffractive optical element constructed of a medium used as a substrate, having an internal transmittance of at least 50% at a wavelength of 300 nm when the thickness is 10 mm.

In the objective lens according to the present invention, the diffractive optical element is optimized to take advantage of a fluorescent wavelength.

The objective lens according to the present invention includes at least one cemented lens component made up of lens elements that have media of different refractive indices and Abbe's numbers.

In the objective lens according to the present invention, an NA of the objective lens where correction for aberration is made and an NA of the objective lens where the effective diameter is determined are different from each other to satisfy the following condition:

$$NAe > 1.5 \times NAc \quad (1)$$

where NAe is the NA of the objective lens where the effective diameter is determined and NAc is the NA of the objective lens where correction for aberration is made.

The objective lens according to the present invention is constructed as a water-immersion objective lens in which the NA of the objective lens where the effective diameter is determined is at least 0.6.

In the objective lens according to the present invention, an optical path length extending along the optical axis is 20 mm or less.

In the objective lens according to the present invention, group delay dispersion relating to an axial ray of light is 1000 f sec$^2$ or less.

In the objective lens according to the present invention, the medium is quartz or fluorite.

The objective lens according to the present invention includes, in order from the specimen side, a plano-convex lens made of quartz, with a convex surface facing the image side; a positive meniscus lens made of quartz, with a convex surface facing the image side; a cemented doublet of a negative meniscus lens made of quartz and a biconvex lens made of fluorite; and a diffractive optical element.

In the objective lens according to the present invention, the wavelength region of the objective lens where correction for aberration is made is a near-infrared region.

In the objective lens according to the present invention, correction for aberration is made in accordance with each wavelength region which is the near infrared region and has a bandwidth of at least 30 nm, and the best position in each wavelength region varies.

The objective lens according to the present invention is exclusively used in a multiphoton microscope.

In the objective lens according to the present invention, a region from the center of the diffractive optical element to the numerical aperture NAc is different from a region from the numerical aperture NAc to the numerical aperture NAe in diffraction efficiency or focal length of the diffractive optical element.

According to the present invention, the objective lens which has a high probability of production of fluorescence in the ultraviolet region by multiphoton excitation in the near-infrared region can be provided.

These and other features and advantages of the present invention will become apparent from the following detailed description of the preferred embodiments when taken in conjunction with the accompanying drawings.

BRIEF DESCRIPTION OF THE DRAWINGS

FIGS. 1A and 1B are sectional views showing arrangements, developed along the optical axis, in transmission of excitation light and fluorescent light, respectively, of a first embodiment of the objective lens according to the present invention;

FIGS. 2A, 2B, and 2C are diagrams showing aberration characteristics of the objective lens in the first embodiment;

FIGS. 5A, 5B, and 5C are diagrams showing aberration characteristics of the objective lens in the second embodiment;

DETAILED DESCRIPTION OF THE PREFERRED EMBODIMENTS

Figure 3:
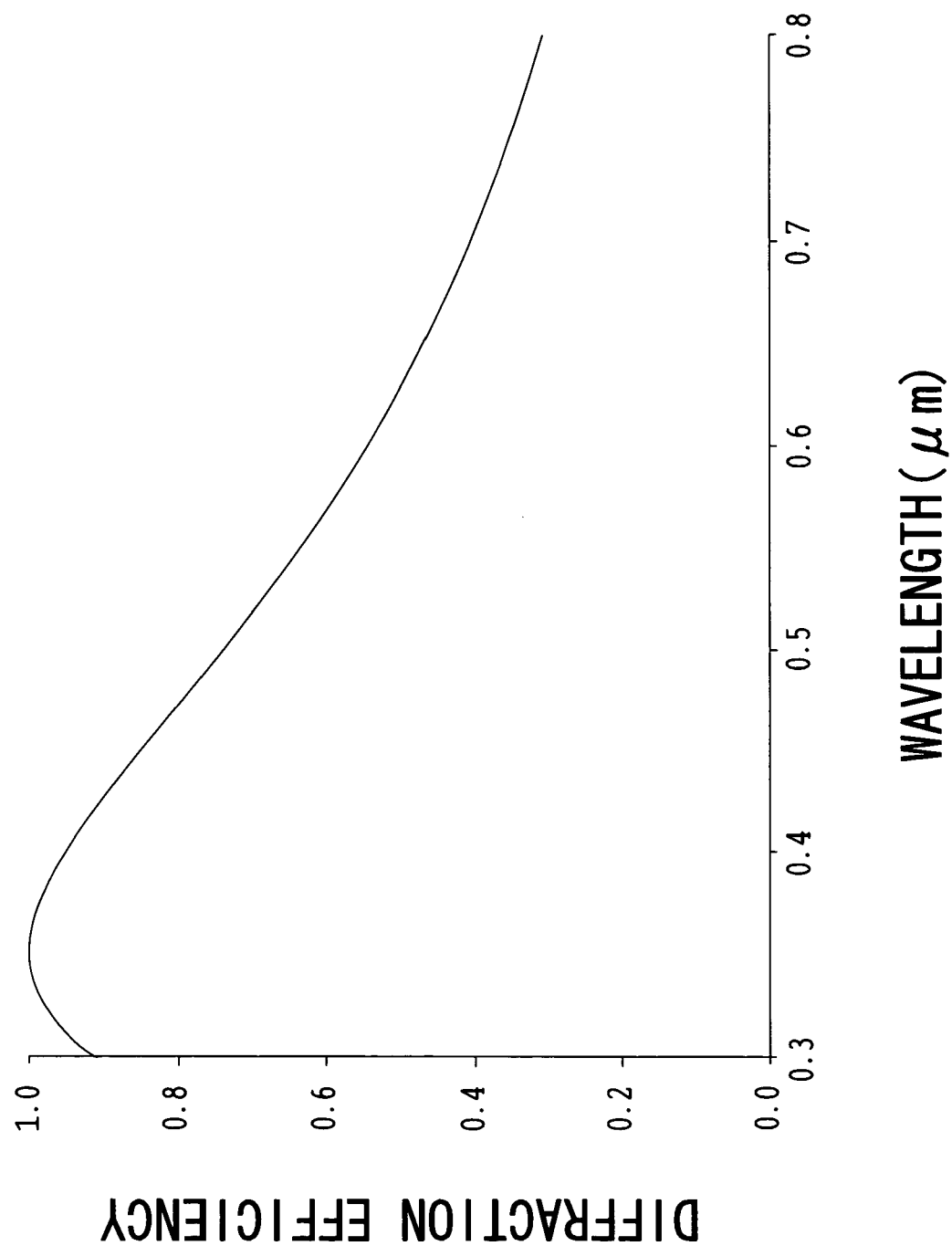
FIG. 3 is a graph showing characteristics of the diffraction efficiency, plotted against the wavelength, of a diffractive optical element used in the objective lens of each of the embodiments in the present invention

Before undertaking the description of the embodiments, the function and effect of the present invention will be explained.

When only media of quartz and fluorite are used as optical elements constituting the objective lens as in the present invention, the value of the group delay dispersion is small and an increase in pulse width can be suppressed.

In such optical elements, the use of an optical element constructed of a medium that has an internal transmittance of at least 50% at a wavelength of 300 nm when the thickness is 10 mm brings about a satisfactory transmittance even at a fluorescence wavelength of 300 nm or less so that fluorescence observation can be carried out.

Like the present invention, when the NA of the objective lens where correction for aberration is made and the NA of the objective lens where the effective diameter is determined are rendered different from each other to satisfy Condition (1), the effective diameter of the objective lens capturing fluorescent light can be increased with respect to the NA of the objective lens for excitation light. Consequently, scattered fluorescent light can also be captured most copiously and can be detected with little loss. However, if media other than quartz and fluorite are used as those of optical elements constituting the objective lens, auto-fluorescence will be produced by the lens itself and detection accuracy of fluorescence resulting from the specimen will be degraded. In the present invention, therefore, as mentioned above, only the media of quartz and fluorite are used as optical elements constituting the objective lens.

Since an NA of the objective lens for excitation light of approximately 0.6 is satisfactory, it is only necessary that the NA of the objective lens where correction for aberration is made is about 0.6 and the wavelength region of the objective lens where correction for aberration is made is a wavelength region used for excitation (the near-infrared region). On the other hand, fluorescent light is preferably captured most copiously, including scattered one, and thus it is desirable that the NA (the effective diameter) of the objective lens for light capture is as large as possible.

When the objective lens is designed like the present invention, a less number of lenses is required and the optical path length is reduced, with the result that the value of the group delay dispersion becomes small and large chirp is not produced. Thus, a smaller amount of prechirp is required.

When the diffractive optical element (DOE) optimized to take advantage of the fluorescent wavelength is used as in the present invention, diffraction efficiency relating to fluorescence is improved and a loss in detection of fluorescence can be minimized. Also, although such an application impairs diffraction efficiency relating to the wavelength of an excitation laser, it does not cause trouble to excitation because when the power of the laser is increased, the intensity of light sufficient to excite the specimen is obtained. In multiphoton absorption, even when multiphoton excitation is caused in only an extremely small area close to the focal point and unwanted order light is generated by the diffractive optical element, there is no problem because the multiphoton excitation is not caused by the unwanted order light.

The diffractive optical element (DOE) used in the present invention is set forth in "Optical Elements for Optical Designers", Optronics Inc., Chaps. 6 and 7, and "NEW METHODS OF DESIGNING HOLOGRAPHIC OPTICAL ELEMENTS", William C. Sweatt, SPIE. VOl. 126, pp. 46–53, 1977. Its principle will be briefly described below.

Figure 7:
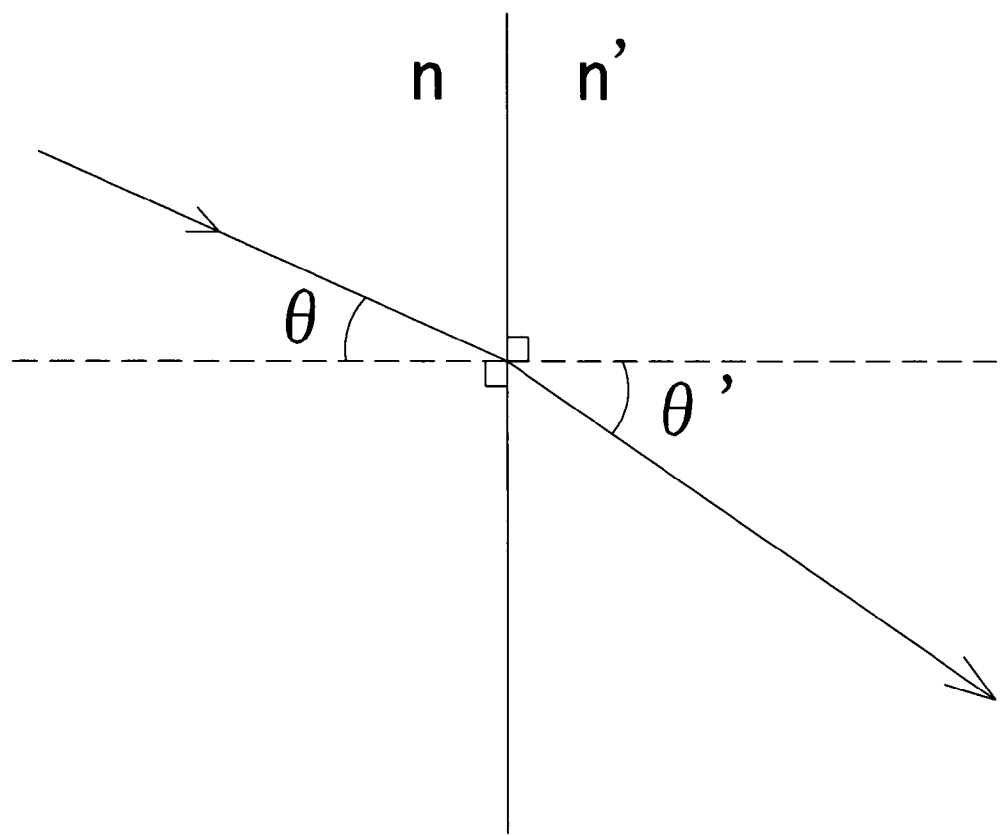
FIG. 7 is an explanatory view showing refraction of light in ordinary glass.

In FIG. 7, ordinary optical glass refracts light in accordance with Snell's law expressed by the following equation:

$$n \sin \theta = n' \sin \theta' \quad (2)$$

where n is the refractive index of a medium on an entrance side, n' is the refractive index of a medium on an exit side, θ is the angle of incidence of a light ray, and θ' is the angle of emergence of the light ray.

Figure 8:
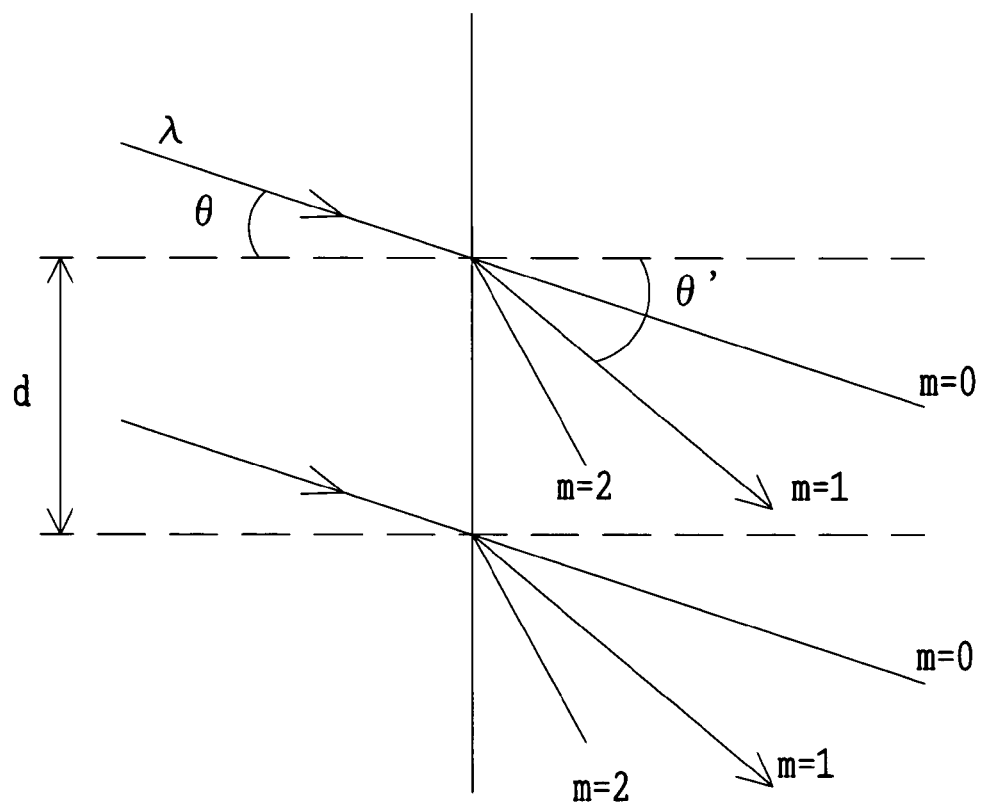
FIG. 8 is an explanatory view showing refraction of light due to a diffraction phenomenon.

On the other hand, in a diffraction phenomenon, as shown in FIG. 8, light is bent in accordance with the law of diffraction expressed by following equation:

$$n \sin \theta - n' \sin \theta' = m\lambda/d \quad (3)$$

where m is the order of diffracted light, λ is a wavelength, and d is a grating distance.

An optical element thus constructed to refract the ray in accordance with this equation is the diffractive optical element.

Figure 9:
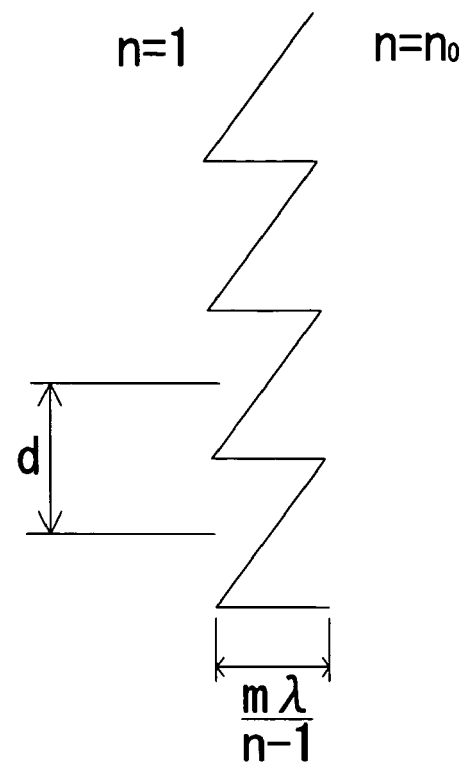
FIG. 9 is a sectional view showing an optimized state of the diffractive optical element.
Figure 10:
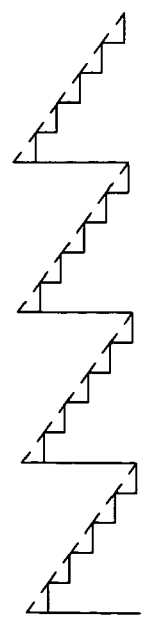
FIG. 10 is a sectional view showing a state of binary approximation of the diffractive optical element.

Also, in FIG. 8, a light-blocking section and a light-transmitting section are provided in parallel at the distance d apart, but as shown in FIG. 9, a diffraction surface of saw-like cross section is provided on the surface of a transparent body and is optimized (blazed), or as shown in FIG. 10, high diffraction efficiency can be obtained by its binary approximation.

Subsequently, reference is made to the advantage of using the above diffractive optical element.

The use of a refraction-system thin lens establishes a relation expressed by the following equation:

$$1/f = (n-1)(1/r_1 - 1/r_2) \quad (4)$$

where f is the focal length of the lens, $r_1$ and $r_2$ are radii of curvature of the entrance surface and the exit surface, respectively, of the lens, and n is the refractive index of the lens.

Differentiation of both sides of Equation (4) by the wavelength λ yields the following equations:

$$df/d\lambda = -f(dn/d\lambda)/(n-1)$$

$$\Delta f = -f\{\Delta n/(n-1)\} \quad (5)$$

Here, if a coefficient multiple effect is eliminated, a dispersion property will be expressed by the value of $\Delta n/(n-1)$ and thus a dispersion value v can be defined as the following equation:

$$v5(n-1)/\Delta n \quad (6)$$

Thus, the dispersion property (an Abbe's number $v_d$) in the visible region is given by the following equation:

$$v_d = (n-1)/(n_F - n_c) \quad (7)$$

On the other hand, the use of the diffractive optical element establishes the following equation:

$$f = h/(n' \sin \theta') = (d_h h)/(m\lambda) \quad (8)$$

where f is the focal length of the diffractive optical element, h is the ray height of incident parallel light, and $d_h$ is a grating distance at the ray height h of incident parallel light.

In the diffraction optical element which is free of aberration, the value of $d_h$ h is constant and therefore f=C/λ (where C is a constant). Differentiation of both sides of f=C/λ by the wavelength λ yields the following equations:

$$df/d\lambda = -C/\lambda^2 = -f/\lambda$$

$$\Delta f = -f(\Delta\lambda/\lambda) \quad (9)$$

Here, $v \equiv (n-1)/\Delta n$ and therefore $v = \Delta\lambda/\lambda$. Hence, the Abbe's number $v_d$ in the visible region of the diffractive optical element is given by the following equation:

$$v_d = \lambda_d/(\lambda_F - \lambda_c) = -3.453 \quad (10)$$

The diffractive optical element, as mentioned above, has a very great negative dispersion property. Since dispersion properties of ordinary glass are about 20–95, it is found that the diffractive optical element has a very great reverse dispersion property. From a similar calculation, it is found that the dispersive optical element has an anomalous dispersion property.

As mentioned above, the NA of the objective lens for excitation light, which is approximately 0.6, is satisfactory, and it is desirable that the NA of the objective lens for light capture is large as possible. Thus, it is effective that the dispersive optical element is designed so that it is divided into two regions, one from the center to the NA for excitation light and the other from the NA for excitation light to the NA for light capture. In FIG. 9, a groove depth $m\lambda/(n-1)$ of each of saw teeth of the diffractive optical element affects the diffraction efficiency, and the diffraction efficiency, as shown in FIG. 3, varies with wavelength. Consequently, it is desirable that the region from the center of the diffractive optical element to the NA for excitation light is set so that the diffraction efficiency has the maximum value at a wavelength in the middle between excitation light and observation light, while the region from the NA for excitation light to the NA for light capture, in which only the wavelength of the observation light is transmitted, is set so that the maximum diffraction efficiency is obtained with the observation light.

Since a pitch d of the diffractive optical element in FIG. 9 affects the focal length, the pitch is changed in the region from the center to the NA for excitation light and the region from the NA for excitation light to the NA for light capture, and the focal lengths of the diffractive optical element in the two regions are changed. In this case also, there is the merit of increasing the number of degrees of design freedom.

In accordance with the drawings, the embodiments of the objective lens of the present invention will be explained below.

First Embodiment

FIGS. 1A and 1B show arrangements, developed along the optical axis, in transmission of excitation light and fluorescent light, respectively, of the first embodiment of the objective lens according to the present invention. FIGS. 2A, 2B, and 2C show aberration characteristics of the objective lens in the first embodiment. FIG. 3 is a graph showing characteristics of the diffraction efficiency, plotted against the wavelength, of the diffractive optical element used in the objective lens of each of the embodiments in the present invention.

The objective lens of the first embodiment, as shown in FIGS. 1A and 1B, includes, in order from the object side, a plano-convex lens $L_1$ made of quartz, with a convex surface of strong curvature facing the image side; a positive meniscus lens $L_2$ made of quartz, with a convex surface of strong curvature facing the image side; a cemented doublet of a negative meniscus lens $L_3$ made of quartz, with a concave surface facing the image side, and a biconvex lens $L_4$ made of fluorite; and a diffractive optical element $L_5$. The diffractive optical element $L_5$, as shown in FIG. 3, is optimized at a wavelength of 380 nm, on the image side of a plane-parallel plate made of quartz.

The diffractive optical element (DOE) used in each embodiment of the present invention is as described above, and the design technique of an optical system including such a diffractive optical element, called an ultra-high index method, is known. This is the method of designing the optical system by replacing the diffractive optical element with a virtual lens with an extremely high refractive index (an ultra-high index lens). This method, set forth in the already-mentioned article (SPIE. VOl. 126, pp. 46–53, 1977), will be briefly explained with reference to FIG. 11.

Figure 11:
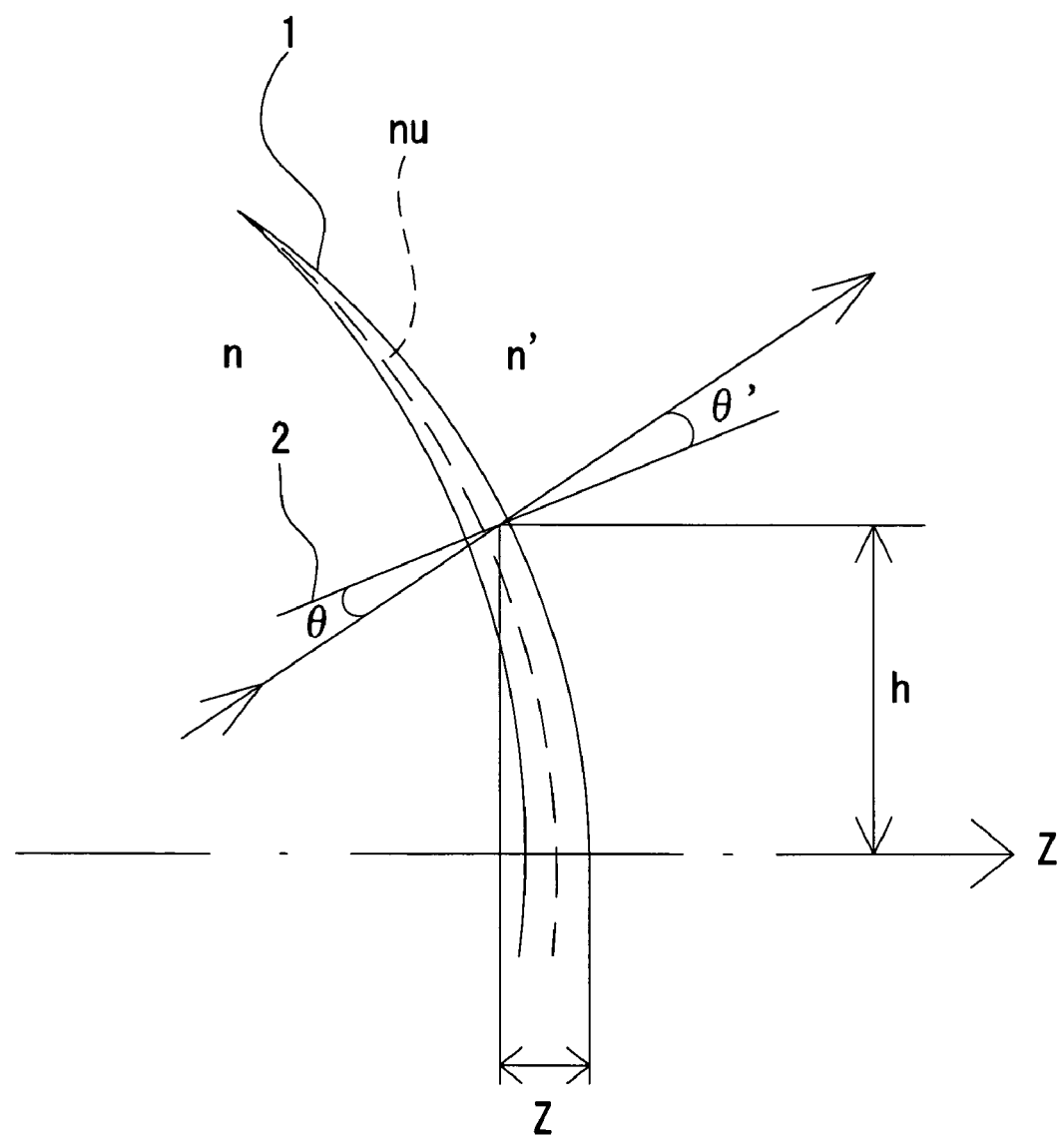
FIG. 11 is an explanatory view showing refraction of light in an ultra-high index lens.

In FIG. 11, reference numeral 1 designates an ultra-high index lens and 2 designates a normal line. A relation established in this ultra-high index lens is expressed by the following equation:

$$(n_U-1)dz/dh=n \sin \theta - n' \sin \theta' \qquad (11)$$

where $n_U$ is the refractive index of the ultra-high index lens, z is the coordinate in the direction of the optical axis of the ultra-high index lens, h is a distance from the optical axis, n and n' are refractive indices of media on entrance and exit sides, respectively, and $\theta$ and $\theta'$ are angles of incidence and emergence, respectively.

Combination of Equations (3) and (11) then yields the following equation:

$$(n_U-1)dz/dh=m\lambda/d \qquad (12)$$

That is, an equivalent relation given by Equation (12) is established between the surface profile of the ultra-high index lens (an index lens with extremely high refracting power) and the pitch of the diffractive optical element, and from data designed by the ultra-high index method through this equation, the pitch of the diffractive optical element can be obtained.

A general axisymmetric aspherical surface is expressed as the following equation:

$$z=ch^2/[1+\{1-(1+k)c^2h^2\}^{1/2}]+Ah^4+Bh^6+Ch^8+Dh^{10}+ \qquad (13)$$

where z is the optical axis (the direction of the image is positive); h is a coordinate axis in a meridional direction, of coordinate axes perpendicular to the z axis, with an intersection of the plane and the z axis as an original; c is the curvature of a reference plane; k is a conic constant; and A, B, C, D, . . . are aspherical coefficients of fourth order, sixth order, eighth order, tenth order, . . . , respectively.

From Equations (12) and (13), the pitch d of the diffractive optical element equivalent to the aspherical surface at some ray height is expressed by the following equation:

$$d=m\lambda/[(n-1)\{ch/(1-c^2(1+k)h^2)^{1/2}+4Ah^3+6Bh^5+8Ch^7+10Dh^9+\dots\}] \qquad (14)$$

Subsequently, numerical data of optical members constituting the objective lens of the first embodiment are shown below. In addition to the data of the objective lens, the following numerical data include data of an image plane not shown in the sectional view, a cover glass surface covering the specimen, and the surface of the specimen. In the numerical data, $r_0, r_1, \ldots$ represent radii of curvature of surfaces of optical members shown in the figures in order from the object side; $d_0, d_1, \ldots$ represent thicknesses of optical members or spacings between their surfaces, shown in the figures in order from the object side, and $G_1, G_2, \ldots$ represent media of optical members or between their surfaces, shown in the figures in order from the object side. These symbols are also used for the numerical data of another embodiment and a comparative example to be described later Also, the refractive index of quartz which is the medium of each optical element constituting the objective lens in each embodiment is 1.50745 and its Abbe's number is 67.82, while the refractive index of fluorite is 1.46730 and its Abbe's number is 94.99.

| Numerical data 1 | | |
|---|---|---|
| $r_0 = \infty$ (specimen surface) | $d_0 = 0.000000$ | $G_0$: water |
| $r_1 = \infty$ (cover glass) | $d_1 = 0.170000$ | |
| $r_2 = \infty$ | $d_2 = 0.500000$ | $G_2$: water |
| $r_3 = \infty$ | $d_3 = 2.827852$ | $G_3$: quartz |
| $r_4 = -2.24427$ | $d_4 = 0.100543$ | |
| $r_5 = -15.91319$ | $d_5 = 2.500000$ | $G_5$: quartz |
| $r_6 = -4.49971$ | $d_6 = 0.125706$ | |
| $r_7 = 44.94069$ | $d_7 = 1.016329$ | $G_7$: quartz |
| $r_8 = 4.83726$ | $d_8 = 5.670543$ | $G_8$: fluorite |
| $r_9 = -9.853741$ | $d_9 = 0.149768$ | |
| $r_{10} = \infty$ | $d_{10} = 2.000000$ | $G_{10}$: quartz |
| $r_{11} = \infty$ | $d_{11} = 0.000000$ | $G_{11}$: quartz |
| $r_{12} = -3121901.9552$ | $d_{12} = 30.00000$ | |
| (DOE) (aspherical surface) | | |
| $r_{13} = \infty$ (image plane) | | |

| Aspherical coefficients |
|---|
| Second surface |

$k = -1.000000$
$A = -0.579671 \times 10^{-8}$  $B = 0.176129 \times 10^{-9}$  $C = -0.358836 \times 10^{-10}$
$D = 0.206033 \times 10^{-11}$
NAc: 0.6 (water immersion)
NAe: 1.1
GDD: 591.8 f sec$^2$ (excitation wavelength: 700 nm)

Second Embodiment

Figure 4A:
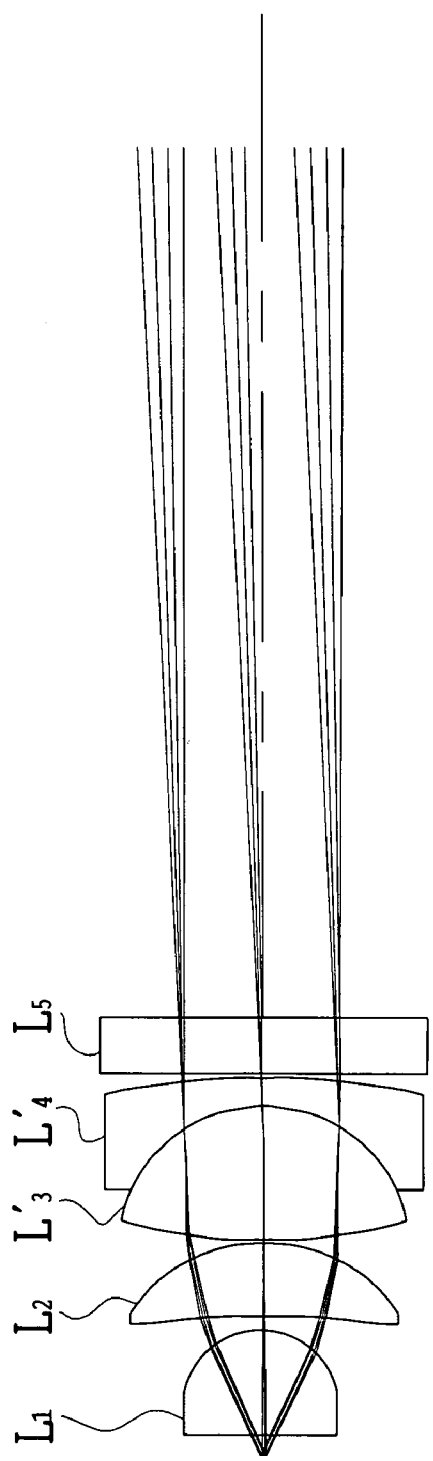
FIGS. 4A and 4B are sectional views showing arrangements, developed along the optical axis, in transmission of excitation light and fluorescent light, respectively, of a second embodiment of the objective lens according to the present invention.
Figure 4B:
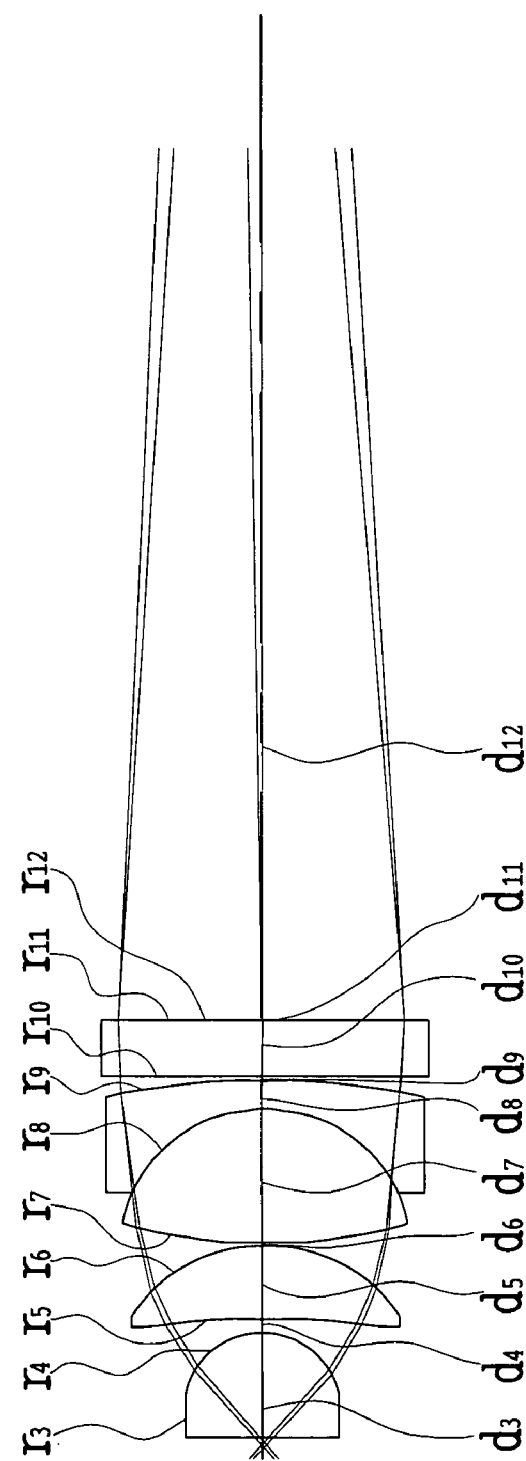

FIGS. 4A and 4B show arrangements, developed along the optical axis, in transmission of excitation light and fluorescent light, respectively, of the second embodiment of the objective lens according to the present invention. FIGS. 5A, 5B, and 5C show aberration characteristics of the objective lens in the second embodiment.

The objective lens of the second embodiment includes, in order from the object side, the plano-convex lens $L_1$ made of quartz, with a convex surface of strong curvature facing the image side; the positive meniscus lens $L_2$ made of quartz, with a convex surface of strong curvature facing the image side; a cemented doublet of a biconvex lens $L_3'$ made of fluorite and a negative meniscus lens $L_4'$ made of quartz, with a concave surface facing the object side; and the diffractive optical element $L_5$.

The diffractive optical element $L_5$, as shown in FIG. 3 like the first embodiment, is optimized at a wavelength of 380 nm, on the image side of a plane-parallel plate made of quartz.

Subsequently, numerical data of optical members constituting the objective lens of the second embodiment are shown below.

| Numerical data 2 | | |
|---|---|---|
| $r_0 = \infty$ (specimen surface) | $d_0 = 0.000000$ | $G_0$: water |
| $r_1 = \infty$ (cover glass) | $d_1 = 0.170000$ | |
| $r_2 = \infty$ | $d_2 = 0.500000$ | $G_2$: water |
| $r_3 = \infty$ | $d_3 = 3.629613$ | $G_3$: quartz |
| $r_4 = -2.62258$ | $d_4 = 0.464639$ | |
| $r_5 = -28.96127$ | $d_5 = 2.500000$ | $G_5$: quartz |
| $r_6 = -5.31605$ | $d_6 = 0.100000$ | |
| $r_7 = 17.45389$ | $d_7 = 4.595595$ | $G_7$: fluorite |
| $r_8 = -4.87156$ | $d_8 = 1.000000$ | $G_8$: quartz |
| $r_9 = -24.78548$ | $d_9 = 0.100000$ | |
| $r_{10} = \infty$ | $d_{10} = 2.000000$ | $G_{10}$: quartz |
| $r_{11} = \infty$ | $d_{11} = 0.000000$ | $G_{11}$: quartz |
| $r_{12} = 2437476.3123$ | $d_{12} = 30.00000$ | |
| (DOE) (aspherical surface) | | |
| $r_{13} = \infty$ (image plane) | | |

-continued

| Aspherical coefficients |
|---|
| Second surface |

$k = -1.000000$
$A = -0.868033 \times 10^{-8}$  $B = 0.838451 \times 10^{-10}$  $C = -0.333972 \times 10^{-10}$
$D = 0.223170 \times 10^{-11}$
NAc: 0.6 (water immersion)
NAe: 1.1
GDD: 591.5 f sec$^2$ (excitation wavelength: 700 nm)

COMPARATIVE EXAMPLE

Figure 6:
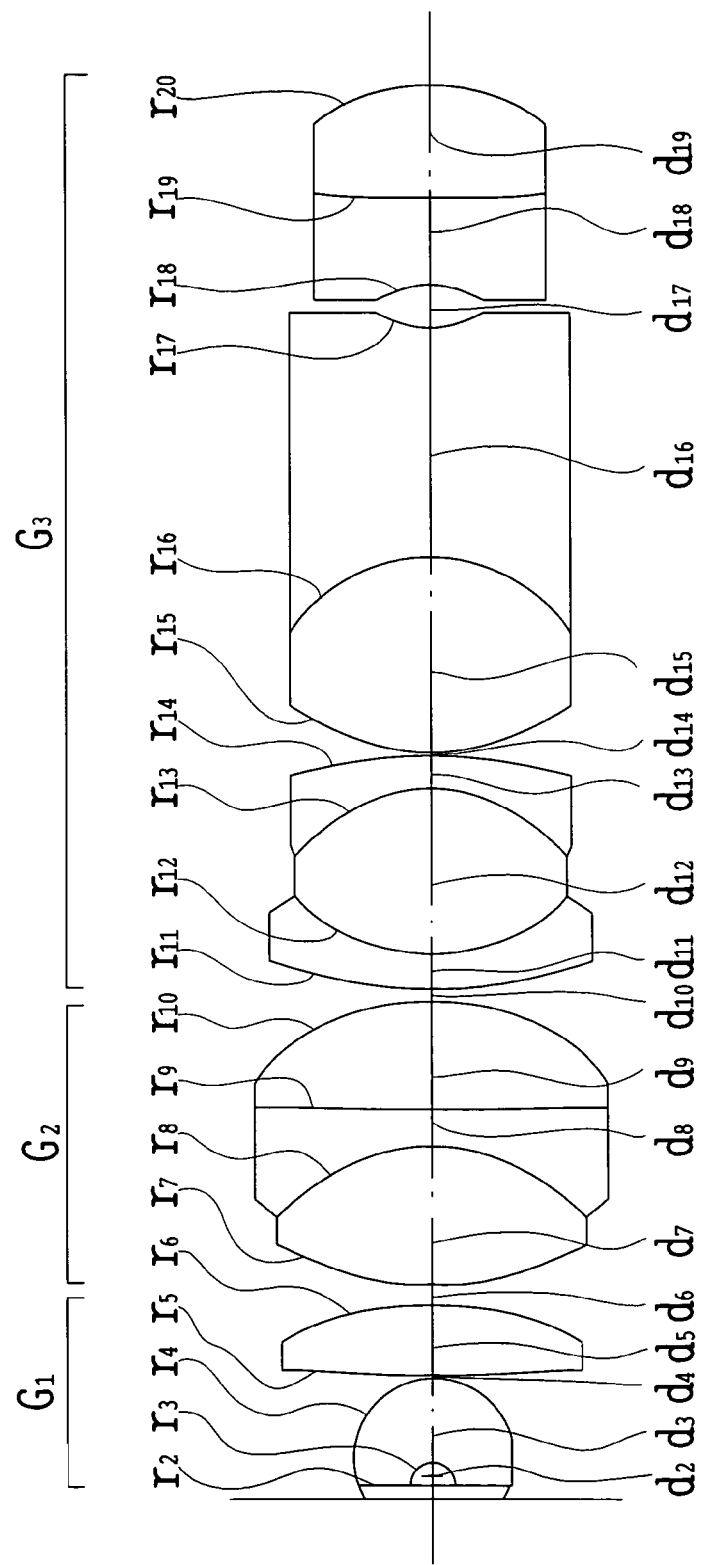
FIG. 6 is a sectional view showing an arrangement, developed along the optical axis, of a conventional two-photon objective lens to be compared with the objective lens of the present invention.

FIG. 6 shows an arrangement, developed along the optical axis, of a conventional two-photon objective lens in the comparative example of the present invention. This objective lens comprises, in order from the object side, a first lens unit $G_1$ including a plano-convex lens having a cemented surface, with a convex surface of strong power facing the image side, and a positive lens; a second lens unit $G_2$ constructed with a cemented lens component of a positive lens, a negative lens, and a positive lens; and a third lens unit $G_3$ including a cemented lens component of a negative lens, a positive lens, and a negative lens, a cemented meniscus lens component of a positive lens and a negative lens, and a cemented meniscus lens component of a negative lens and a positive lens.

Subsequently, numerical data of optical members constituting the objective lens of the comparative example are shown below. Also, in the comparative example, $n_{d2}, n_{d3}, \ldots$ denote refractive indices in the d line of optical members shown in the figure in order from the object side and $\nu_{d2}, \nu_{d3}, \ldots$ denote Abbe's numbers of optical members shown in the figure in order from the object side. In the comparative example, neither quartz nor fluorite is used as the medium of each optical element constituting the objective lens.

| Numerical data 3 | | | |
|---|---|---|---|
| $r_0 = \infty$ (specimen surface) | $d_0 = 0.000000$ | | $G_0$: water |
| $r_1 = \infty$ (cover glass) | $d_1 = 0.175$ | | |
| $r_2 = \infty$ | $d_2 = 0.6900$ | $n_{d2} = 0.6900$ | $\nu_{d2} = 66.81$ |
| $r_3 = -0.8003$ | $d_3 = 2.7155$ | $n_{d3} = 1.78650$ | $\nu_{d3} = 50.00$ |
| $r_4 = -2.6600$ | $d_4 = 0.2000$ | | |
| $r_5 = 54.9121$ | $d_5 = 2.4000$ | $n_{d5} = 1.78650$ | $\nu_{d5} = 50.00$ |
| $r_6 = -9.5242$ | $d_6 = 0.802$ | | |
| $r_7 = 10.1548$ | $d_7 = 4.8000$ | $n_{d7} = 1.43875$ | $\nu_{d7} = 94.97$ |
| $r_8 = -6.3000$ | $d_8 = 1.1500$ | | |
| $r_9 = 202.1692$ | $d_9 = 3.7000$ | $n_{d9} = 1.43875$ | $\nu_{d9} = 94.97$ |
| $r_{10} = -7.8211$ | $d_{10} = 0.4$ | | |
| $r_{11} = 15.4103$ | $d_{11} = 1.1000$ | $n_{d11} = 1.78650$ | $\nu_{d11} = 50.00$ |
| $r_{12} = 6.4029$ | $d_{12} = 5.8000$ | $n_{d12} = 1.43875$ | $\nu_{d12} = 94.97$ |
| $r_{13} = -5.4177$ | $d_{13} = 1.0012$ | $n_{d13} = 1.61340$ | $\nu_{d13} = 43.84$ |
| $r_{14} = -19.6199$ | $d_{14} = 0.1200$ | | |
| $r_{15} = 8.7057$ | $d_{15} = 6.7000$ | $n_{d15} = 1.4970$ | $\nu_{d15} = 81.61$ |
| $r_{16} = -5.3902$ | $d_{16} = 7.7834$ | $n_{d16} = 1.52944$ | $\nu_{d16} = 51.72$ |
| $r_{17} = 4.1061$ | $d_{17} = 1.5801$ | | |
| $r_{18} = -3.6364$ | $d_{18} = 2.8593$ | $n_{d18} = 1.49831$ | $\nu_{d18} = 65.03$ |
| $r_{19} = 76.2530$ | $d_{19} = 3.9133$ | $n_{d19} = 1.59551$ | $\nu_{d19} = 39.21$ |
| $r_{20} = -6.9216$ | | | |
| NAc: 1.15 | | | |
| NAe: 1.15 | | | |
| GDD: 2650 f sec$^2$ (excitation wavelength: 700 nm) | | | |

What is claimed is:

1. An objective lens including:
   an optical element made of a medium that shows an internal transmittance of at least 50% through a thickness of 10 mm for a wavelength of 300 nm; and
   at least one diffractive optical element having a substrate made of a medium that shows an internal transmittance of at least 50% through a thickness of 10 mm for a wavelength of 300 nm.

2. An objective lens according to claim 1, wherein the diffractive optical element is optimized to take advantage of a fluorescent wavelength.

3. An objective lens according to claim 1, including at least one cemented lens component having lens elements made of media of different refractive indices and Abbe's numbers.

4. An objective lens according to claim 1, wherein an NA of the objective lens where correction for aberration is made and an NA of the objective lens where an effective diameter is determined are different from each other to satisfy the following condition:

$$NAe > 1.5 \times NAc$$

where NAe is the NA of the objective lens where the effective diameter is deter-mined and NAc is the NA of the objective lens where correction for aberration is made.

5. An objective lens according to claim 4, wherein a region from a center of the diffractive optical element to the numerical aperture NAc is different from a region from the numerical aperture NAc to the numerical aperture NAe in diffraction efficiency or focal length of the diffractive optical element.

6. An objective lens according to claim 1, constructed as a water-immersion objective lens in which an NA of the objective lens where an effective diameter is determined is at least 0.6.

7. An objective lens according to claim 1, wherein an optical path length extending along an optical axis is 20 mm or less.

8. An objective lens according to claim 1, wherein group delay dispersion relating to an axial ray of light is 1000 f sec$^2$ or less.

9. An objective lens according to claim 1, wherein at least one of the media that show an internal transmittance of at least 50% through a thickness of 10 mm for a wavelength of 300 nm is quartz or fluorite.

10. An objective lens according to claim 1, comprising, in order from an object side:
    a plano-convex lens made of quartz, with a convex surface facing an image side; a positive meniscus lens made of quartz, with a convex surface facing the image side; a cemented doublet of a negative meniscus lens made of quartz and a biconvex
    lens made of fluorite; and a diffractive optical element.

11. An objective lens according to claim 1, wherein a wavelength region for which correction for aberrations is made is a near-infrared region.

12. An objective lens according to claim 1, wherein correction for aberrations is made for each wavelength band having a bandwidth of at least 30 nm in a near infrared region, and a best position in each wavelength band varies.

13. An objective lens according to claim 1, exclusively used in a multiphoton microscope.

* * * * *

UNITED STATES PATENT AND TRADEMARK OFFICE
CERTIFICATE OF CORRECTION

PATENT NO. : 7,042,648 B2
APPLICATION NO. : 10/823639
DATED : May 9, 2006
INVENTOR(S) : Shingo Kashima It is certified that error appears in the above-identified patent and that said Letters Patent is hereby corrected as shown below:

| Column | Line | |
|---|---|---|
| 2 | 4 | Delete "since". |
| 2 | 6 | Change "greater" to --as great--. |
| 2 | 23 | After "usually" delete "used". |
| 2 | 52 | Before "transmit" delete quotation marks. |
| 2 | 53 | After "wavelength" and before "transmit" delete quotation marks. |
| 2 | 55 | After "length" delete quotation marks. |
| 4 | 1 | Change "is the near" to --is in the near--. |
| 6 | 38 | Change "$v5_{(n-1)}/\Delta_n$" to --$v\equiv(n-1)/\Delta_n$--. |
| 7 | 7 | Change "is large" to --is as large--. |
| 7 | 62 | Change "VOI." to --VOL.--. |
| 11 | 26 | Change "deter-mined" to --determined--. |
| 12 | 21 | After "biconvex" continue sentence and do not start new paragraph. |

Signed and Sealed this

Nineteenth Day of December, 2006

JON W. DUDAS
*Director of the United States Patent and Trademark Office*